April 20, 1965 G. C. LOCKWOOD 3,179,819

SIGNAL-LIMITING AMPLIFIERS

Original Filed Jan. 19, 1961 2 Sheets-Sheet 1

INVENTOR
GEORGE C. LOCKWOOD

BY Louis A. Kline
J. Cavender
HIS ATTORNEYS

SIGNAL-LIMITING AMPLIFIERS

Original Filed Jan. 19, 1961 2 Sheets-Sheet 2

INVENTOR
GEORGE C. LOCKWOOD
BY Louis A Kline
J Cavender
HIS ATTORNEYS

United States Patent Office 3,179,819
Patented Apr. 20, 1965

3,179,819
SIGNAL-LIMITING AMPLIFIERS

George C. Lockwood, Dayton, Ohio, assignor to The National Cash Register Company, Dayton, Ohio, a corporation of Maryland Continuation of abandoned application Ser. No. 83,703, Jan. 19, 1961. This application Feb. 4, 1964, Ser. No. 342,866
3 Claims. (Cl. 307—88.5)

Figure 1:
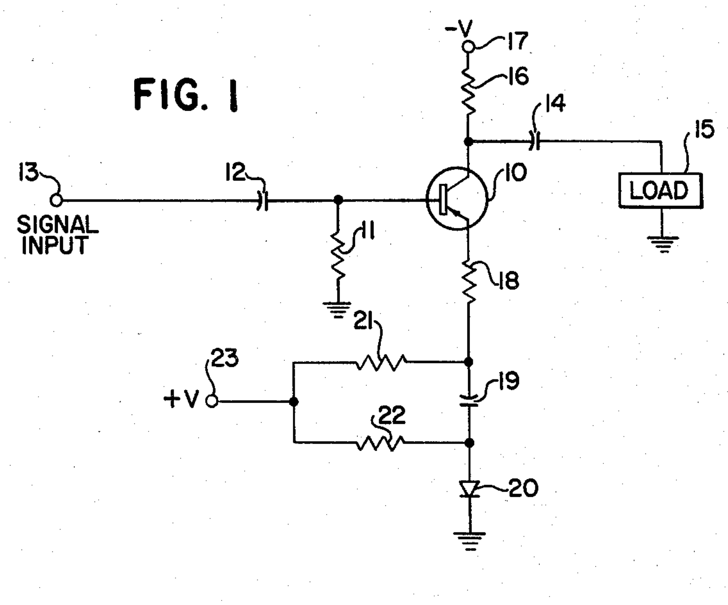

This application is a continuation of application Serial No. 83,703 of George C. Lockwood for Signal Amplifying System, filed January 19, 1961, now abandoned.

The present invention relates generally to a new and improved signal-translating apparatus and more specifically relates to a novel limiting amplifier capable of bilaterally limiting the amplitude of an input signal.

In substantially all of the various well-known limiting amplifiers, signal limiting is normally accomplished in a manner whereby signal excursions of one polarity cause the particular translating device being utilized to be biased to cut-off, whereas signal excursions of the opposite polarity bias the translating device to saturation. In the type of limiting amplifier in which a transistor is utilized as the signal-translating device, the input impedance thereof drops essentially to zero each time the transistor is driven to saturation. Such a characteristic is highly undesirable in those circuits having an impedance matching requirement. In addition, it is a well-known phenomenon that, after a transistor is driven to saturation, a definite amount of delay is encountered in subsequently turning the transistor off, due to the fact that the minority carriers must be removed from the base before collector current ceases to flow. In present-day high-speed computing devices, this delay is at times appreciable with respect to the total computing time involved and, accordingly, is constantly sought to be eliminated.

It is a primary object of the present invention to devise a new and improved signal-translating apparatus which is of comparatively simple circuit arrangement and yet is highly effective in bilaterally limiting the amplitude of an incoming signal.

A more specific object of the present invention is to devise a novel limiting amplifier circuit which does not depend upon saturation of the particular signal-translating device utilized, is extremely fast-acting, and maintains a substantially constant input impedance during operation thereof.

In accordance with the present invention, such a novel signal-limiting amplifier circuit comprises a signal translating device having an input electrode, an output electrode, and a common electrode. A first series circuit arrangement comprising a relatively low value degeneration resistor connected to said common electrode of said translating device and a relatively high value biasing-degeneration resistor connected to a source of biasing potential is provided for forward biasing the translating device such that a steady state bias current normally flows therethrough of a predetermined threshold level with the result that a signal applied to the input electrode of the translating device causes amplitude variations of the current therethrough about the thus established bias level. The limiting amplifier further includes a second series circuit arrangement comprising a capacitive device connected to the junction of the degeneration resistors and a unilaterally conducting device connected to a source of reference potential, and means for forward biasing the unilaterally conducting device so that a steady state bias current normally flows therethrough of a magnitude substantially equal to the magnitude of the maximum desired current variation through the translating device above the threshold level, whereby any small-amplitude input signal components which cause amplitude variations of the current through the translating device below the maximum desired value are substantially amplified and any large-amplitude input signal components which tend to cause amplitude variations of the current through the translating device above the maximum desired value causes the unilaterally conducting device to be cut-off and thereby renders the biasing-degeneration resistor operative to effect a substantial attenuation of the large-amplitude signal components.

Figure 2:
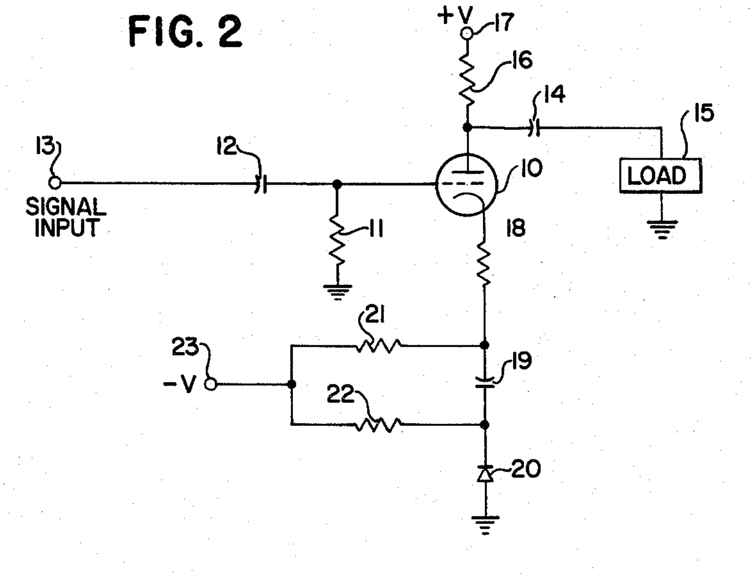
Figure 3:
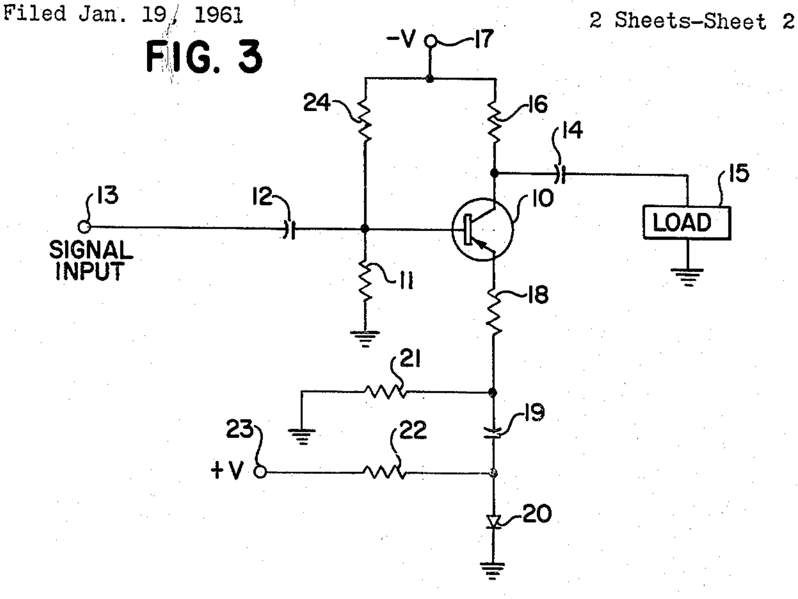
Figure 4:
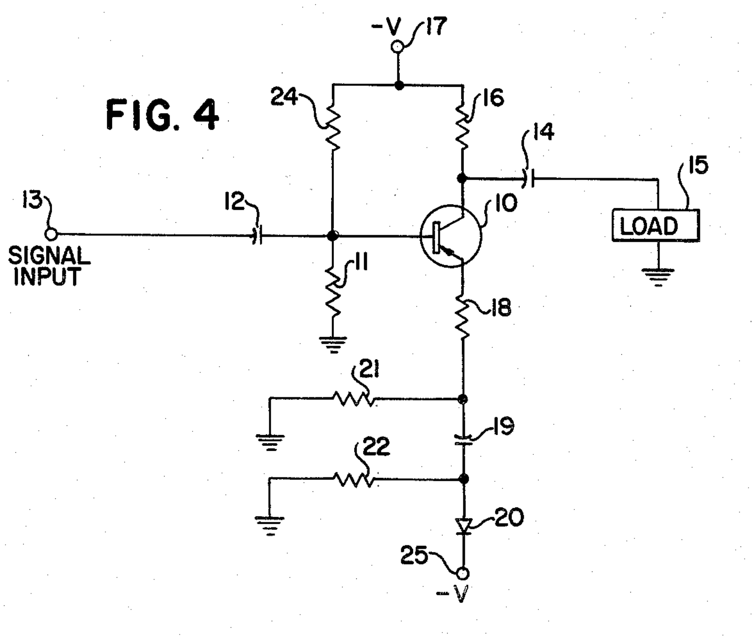

The features of the present invention which are believed to be novel are set forth with particularity in the appended claims. The organization and manner of operation of the invention, together with further objects and advantages thereof, may best be understood by reference to the following description, taken in connection with the accompanying drawings, in the several figures of which, like reference numerals identify like or similar elements, and in which:

FIG. 1 is a schematic illustration depicting the novel features of the present invention; and FIGS. 2 through 4 schematically illustrate various other embodiments of the present invention.

With reference to FIG. 1, a limiting amplifier circuit constructed in accordance with the present invention preferably comprises a signal-translating device in the form of a PNP junction transistor 10, the base of which functions as an input electrode, the collector of which functions as an output electrode, and the emitter of which functions as a common electrode. Accordingly, the base of the transistor is returned through resistor 11 to a suitable source of reference potential such as ground and is additionally coupled through coupling capacitor 12 to input terminal 13, which is adapted to receive an alternating polarity signal from any suitable source such as, for example, those shown and described in section 14 of the "Handbook of Semi-Conductor Electronics," by L. P. Hunter. The transistor collector is coupled through coupling capacitor 14 to load 15 and, additionally, is connected through dropping resistor 16 to bias terminal 17, which, in turn, is adapted to be connected to a suitable source of negative unidirectional operating potential. The transistor emitter is connected to a suitable source of reference potential, such as ground, through a series circuit arrangement comprising degeneration resistor 18, coupling capacitor 19, and crystal diode 20. The junctions between resistor 18 and capacitor 19 and between capacitor 19 and crystal diode 20 are respectively connected through dropping resistors 21 and 22 to bias terminal 23, which is adapted to be connected to a suitable source of positive unidirectional operating potential.

The mode of operation of the circuit arrangement illustrated in FIG. 1 is as follows: Due to the fact that the base of the transistor is returned to ground potential via resistor 11 and the common electrode thereof—i.e., the emitter—is coupled to a positive bias source via terminal 23 and series-connected resistors 18 and 21, the emitter-base junction of the transistor is forward biased in the low resistance direction; consequently base current flows outwardly therefrom and thereby renders the transistor normally conductive. The value of dropping resistor 21 is chosen to be several orders of magnitude greater than the value of the dynamic base-to-emitter resistance of the transistor plus the value of degeneration resistor 18, so that, neglecting the negligible potential drop across resistor 11 due to base current flowing therethrough, a close approximation of value of the steady state emitter current flowing into the transistor is determined by dividing the magnitude of the bias potential applied to terminal 23 by the value of resistor 21.

It is also to be noted that diode 20 is forward biased by an amount determined by the value of dropping resistor 22 and the magnitude of the bias potential applied to bias terminal 23. Consequently, diode 20 is normally rendered conductive, whereby its impedance in the forward direction is substantially zero. For reasons to become more apparent hereinafter, it is preferred that the values of bias resistors 21 and 22 be equal, so that the bias current flowing into the transistor is substantially equal to the bias current flowing through diode 20. The values of coupling and bypass capacitors 12, 14, and 19 are desired to be sufficiently high to provide low impedance signal paths at the frequency of the input signal which is applied to the base of the transistor via input terminal 13. Thus, by virtue of the fact that a replica of the input signal applied to the base of the transistor appears on its emitter (neglecting the negligible potential drop across the dynamic base-to-emitter impedance of the transistor), the instantaneous value of the signal current flowing through the series circuit arrangement comprising diode 20, capacitor 19, and resistor 18 is substantially equal to the instantaneous value of the input signal potential, hereinafter designated "E," divided by the value of degeneration resistor 18, hereinafter designated $R_{18}$. Stated another way, the degree or amount by which the input signal modulates the steady state emitter current is effectively determined by the quotient $E/R_{18}$.

Therefore, when the instantaneous amplitude of the input signal potential is positive by an amount such that the quotient $E/R_{18}$ is equal to or greater than the value of the steady state emitter current, the net emitter current flowing into the transistor is substantially reduced to zero, resulting in the transistor's being cut off. However, prior to the time the transistor is cut off, the circuit has maximum gain characteristic with respect to the incoming signal, during which time the instantaneous value of the current flowing through diode 20 is substantially equal to the algebraic summation of the steady state bias current and the alternating signal current flowing therethrough. As previously stated, the magnitude of the steady state bias current through diode 20 is substantially determined by the value of resistor 22 and the magnitude of the bias potential at terminal 23, whereas the instantaneous value of the signal current therethrough is substantially determined by the value of resistor 18 and the instantaneous value of the signal potential applied to input terminal 13. Thus, when the instantaneous amplitude of the input signal is increased negatively, the emitter current is proportionally increased, so that, when the instantaneous amplitude of the input signal potential is negative by an amount such that the quotient $E/R_{18}$ is equal to the value of the steady state emitter current, the total instantaneous emitter current flowing into the transistor is twice the value of the steady state emitter current.

When the instantaneous magnitude of the input signal increases negatively until the instantaneous emitter current is twice the steady state value, the current through diode 20 is reduced substantially to zero. As a result of the current through diode 20 being reduced to zero, the parallel combination of resistors 21 and 22 is operatively connected in series with resistor 18 to provide a substantial increase in degeneration in the transistor, so that a further increase of the input signal in a negative direction does not appreciably cause a further increase in emitter current.

Thus, there has been devised a novel signal amplifier and limiter which does not depend upon transistor saturation. As a result of the absence of saturation, substantially constant input impedance is maintained, and, in addition, the circuit is extremely fast acting and maintains a substantially constant limiting level.

In order to attain symmetrical limiting, it is necessary for the steady state bias current through diode 20 to be substantially equal in magnitude to the steady state bias current flowing into the emitter of the transistor. However, whether or not symmetrical limiting is desired, it is to be appreciated that diode 20 is forward biased by an amount determined by the degree of permissible amplitude variation of the emitter current above the steady state bias level thereof.

Listed below in chart form are exemplary values and types of the various components and bias potentials preferably utilized by the novel limiting amplifier schematically shown in FIG. 1. It is, of course, to be appreciated that the various novel aspects of the present invention are in no way dependent upon any specific type or value of component or bias potential, as various other types and values may be utilized with equal success.

| | | |
|---|---|---|
| Transistor 10—2N404GT. | Terminal 17——10 v. | Resistor 22—10 KΩ. |
| Resistor 11—10 KΩ. | Resistor 18—200Ω. | Terminal 23—+10 v. |
| Capacitor 12—1 μf. | Capacitor 19—1 μf. | Limiting level—±.2 v. |
| Capacitor 14—1 μf. | Diode 20—1 N34. | |
| Resistor 16—4 KΩ. | Resistor 21—10 KΩ. | |

While a particular embdiment of the invention has been shown and described with respect to FIG. 1, from a comprehension of the foregoing it will be readily obvious to those skilled in the art that changes and modifications may be made without departing from the invention in its broader aspects. For example, while a PNP junction transistor is illustrated as a matter of convenience, it is immediately obvious that an NPN transistor may equally well be employed, providing that the various bias and operating voltages of the circuit are appropriately changed in a manner well known to those skilled in the art. A further obvious modification may be made in the manner illustrated in FIG. 2. In this embodiment, transistor 10 is replaced by a conventional vacuum tube simply by suitably reversing the polarity of diode 20 and the polarities of the bias potentials at terminals 17 and 23. The modification illustrated in FIG. 3 involves returning resistor 21 to ground rather than to terminal 23, plus the addition of resistor 24 connected between the base of transistor 10 and bias terminal 17. In the manner illustrated in FIG. 4, the circuit arrangement of FIG. 3 may successfully be further modified by returning resistor 22 to ground rather than to bias terminal 23, plus returning the cathode of diode 20 to a source of negative potential via terminal 25 rather than to ground as in FIG. 3. As the mode of operation of each of the modified circuit arrangements illustrated in FIGS. 2 through 4 is practically identical with respect to the mode of operation of the circuit arrangement of FIG. 1, which has hereinbefore been fully described in detail, a further detailed description thereof is not deemed necessary.

Having thus fully described the various novel aspects of the present invention together with various changes and modifications thereof, the aim in the appended claims is to cover all such changes and modifications as fall within the true spirit and scope of the invention.

What is claimed is:

1. A signal-limiting amplifier circuit comprising:

a transistor having an input electrode, an output electrode, and a common electrode;

a first series circuit means comprising a relatively low value degeneration resistor connected to said common electrode of said transistor and a relatively high value biasing-degeneration resistor connected to a source of biasing potential for forward biasing said transistor such that a steady state bias current normally flows therethrough of a predetermined threshold level with the result that a signal applied to said input electrode causes amplitude variations of said current about said bias level;

a second series circuit arrangement comprising a capacitive device connected to the junction of said degeneration resistors and a unilaterally conducting device connected to a source of reference potential;

and means including a resistor connected to the junction of said capacitive device and said unilaterally conducting device for forward biasing said unilaterally conducting device with a steady state bias current of a magnitude substantially equal to the magnitude of maximum desired current variation through said transistor above said threshold level, whereby any small amplitude input signal components causing amplitude variations of the current through said transistor below the desired maximum value are amplified and any large amplitude input signal components tending to cause amplitude variations of the current through said transistor above the said desired maximum value cause said unilaterally conducting device to be cut-off thereby rendering said biasing-degeneration resistor operative to effect attenuation of said large amplitude signal components.

2. A signal-limiting amplifier circuit in accordance with claim 1 wherein the emitter electrode of said transistor constitutes the common electrode.

3. A signal-limiting amplifier circuit in accordance with claim 1 wherein said transistor is of a PNP variety.

No references cited.

JOHN W. HUCKERT, *Primary Examiner.*